United States Patent
Bach et al.

(10) Patent No.: US 7,118,623 B2
(45) Date of Patent: Oct. 10, 2006

(54) DIARYL YELLOW PIGMENT PREPARATIONS

(75) Inventors: Heinz Bach, Frankfurt (DE); Ulrich Ott, Hofheim (DE); Rainer Winter, Oberursel (DE); Thomas Heber, Hattersheim (DE); Rolf Kaiser, Frankfurt (DE)

(73) Assignee: Clariant GmbH, Frankfurt (DE)

( * ) Notice: Subject to any disclaimer, the term of this patent is extended or adjusted under 35 U.S.C. 154(b) by 351 days.

(21) Appl. No.: 10/469,751

(22) PCT Filed: Feb. 28, 2002

(86) PCT No.: PCT/EP02/02124

§ 371 (c)(1),
(2), (4) Date: Sep. 4, 2003

(87) PCT Pub. No.: WO02/070611

PCT Pub. Date: Sep. 12, 2002

(65) Prior Publication Data

US 2004/0220391 A1    Nov. 4, 2004

(30) Foreign Application Priority Data

Mar. 6, 2001 (DE) ................................ 101 10 596

(51) Int. Cl.
*C09B 67/20* (2006.01)
*C09B 67/00* (2006.01)
*C09D 11/02* (2006.01)

(52) U.S. Cl. ................... 106/493; 103/31.75; 103/494; 103/499; 103/500; 430/108.1; 430/108.2; 430/108.21

(58) Field of Classification Search ............. 106/31.75, 106/493, 494, 499, 500; 430/108.1, 108.2, 430/108.21

See application file for complete search history.

(56) References Cited

U.S. PATENT DOCUMENTS 5,266,682 A    11/1993    Uhrig et al.

FOREIGN PATENT DOCUMENTS

| EP | 313360 | 4/1989 |
|----|--------|--------|
| EP | 0513782 | 11/1992 |
| EP | 0671443 | 9/1995 |
| JP | 10120930 | 9/1998 |
| WO | WO 9923172 | 5/1999 |

*Primary Examiner*—Anthony J. Green
(74) *Attorney, Agent, or Firm*—Anthony A. Bisulca

(57) ABSTRACT

The invention relates to a diaryl yellow pigment preparation, including a) at least one diaryl yellow pigment b) at least one natural resin on the basis of rosin or modified rosin, c) at least one compound of formula (1), and d) an aluminum, zinc, manganese or iron compound in an amount of from 0.1 to 8% by weight (calculated as a metal cation), based on component b). The inventive preparations are suitable for a variety of applications, among them the production of printing inks, especially offset printing inks.

15 Claims, No Drawings

DIARYL YELLOW PIGMENT PREPARATIONS

The invention relates to diaryl yellow pigments prepared with a special combination of natural resin derivatives and having improved performance properties when used in offset printing inks.

Offset printing inks are subject to particular requirements as regards rheology, i.e., the viscosity and fluidity, and as regards coloristics, such as color strength, for example. Offset printing inks ought on the one hand to possess a high fluidity, in order to be suitable for use in high-speed rotary Offset machines. On the other hand an increase in the viscosity at high shear rates, such as occur in the roll nips and in the plate cylinders of the printing machines, counteracts the misting of the printing ink.

In dependence on the nature of the pigment class a variety of methods of preparing the pigment particles have been proposed.

EP-A-0 313 360 discloses preparing azo pigments and phthalocyanine pigments with an equimolar amount, based on the pigment, of a pine resin and with an aluminum salt, in order to improve dispersing and raise color strength in printing inks.

In EP-A-0 671 443 the tendency of resinated pigments toward self-heating is lowered by addition of polyvalent metals to the aqueous pigment suspension.

JP-A-10 120930 proposes preparing disazo pigments with abietic acid and with a mixture of a Ca salt and an Al salt.

The stated methods of the prior art have deficiencies, particularly as regards diaryl yellow pigments, in color strength, in viscosity and/or in fluidity.

The object was therefore to prepare diaryl yellow pigments such that they have high fluidity, a high viscosity, and good coloristic properties, such as high color strength, for example.

It has been found that a combination of diaryl yellow pigments with natural resin, certain abietic acid derivatives, and a defined amount of an Al, Zn, Mn or Fe compound surprisingly achieves the stated object.

The present invention provides a diaryl yellow pigment preparation comprising
a) at least one diaryl yellow pigment,
b) at least one natural resin based on rosin or modified rosin,
c) at least one compound of the formula (1)

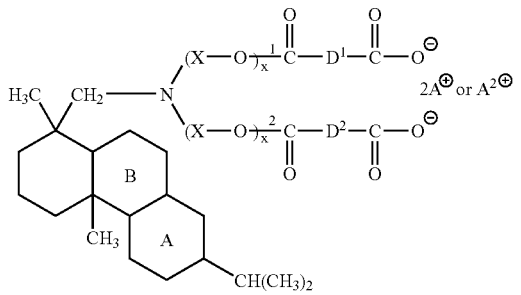

in which the ring A is saturated, unsaturated or aromatic and the ring B is saturated or unsaturated;
X for a group of the formulae —$CH_2$—$CH_2$—, —$CH_2CH(CH_3)$— or —$CH(CH_3)CH_2$—, or a combination thereof;
$x^1$ and $x^2$ are a number from 0 to 16, the sum of $x^1$ and $x^2$ being a number from 2 to 20;
$D^1$ and $D^2$ are identical or different and are a saturated or olefinic $C_1$–$C_4$-hydrocarbon radical;
$A^{\oplus}$ and $A^{2\oplus}$ are an ammonium ion of an amine of the formula

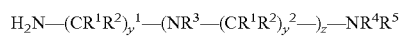

in which $R^1$ to $R^5$ are identical or different and are hydrogen, methyl or ethyl, $y^1$ and $y^2$ are each a number from 1 to 4, and z is a number from zero to 10; and
d) an aluminum, zinc, manganese or iron compound in an amount of from 0.1 to 8% by weight (calculated as metal cation), based on component b), and if desired
e) a polyesteramide and/or customary auxiliaries.

By diaryl yellow pigments a) are meant in general those of the formula (2)

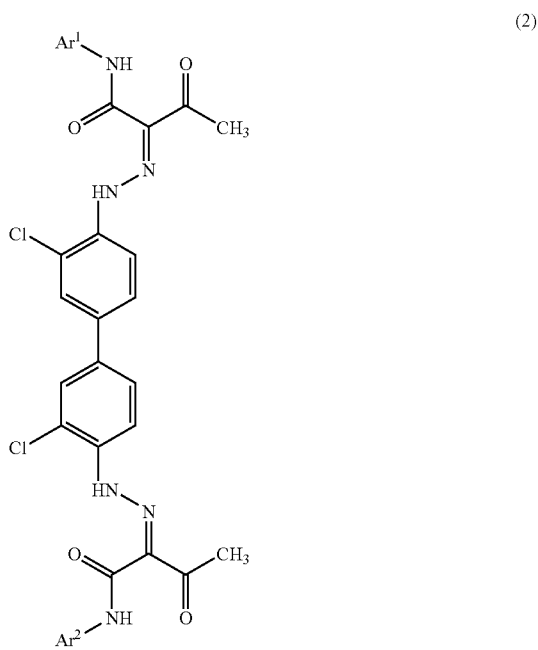

in which $Ar^1$ and $Ar^2$ are identical or different and are an unsubstituted phenyl group or a phenyl group substituted by from one to three substituents from the group consisting of halogen, such as chlorine, methyl, and methoxy.

Preferred diary yellow pigments for the purposes of the present invention are C.I.P. Yellow 12, 13, 14, 17, 126, 127, 174, 176, and 188.

By a natural resin b) are meant, in general, natural resin acids, their hydrogenation products and disproportionation products, and Diels-Alder adducts of rosin and maleic anhydride, the stated resin compounds preferably being in the form of the commercially customary types of rosin or obtained therefrom. Natural resin acids are, for example, abietic acid, dehydroabietic acid, dihydroabietic acid, tetrahydroabietic acid, levopimaric acid, dextropimaric acid, and isodextropimaric acid, and mixtures thereof.

Component c) is derived preferably from abietylamine, dehydro- or dihydroabietylamine. Furthermore, $x^1$ and $x^2$ are preferably a number from 1 to 10, the sum of $x^1$ and $x^2$ being preferably from 4 to 16. $D^1$ and $D^2$ are preferably —$CH_2$—, $CH_2CH_2$—, —$(CH_2)_4$—, and —CH=CH—, especially —CH=CH—; and $y^1$ and $y^2$ are each preferably 2 or 3, and z is preferably a number from 1 to 4.

Particular preference is given to the compound of the formula (1a)

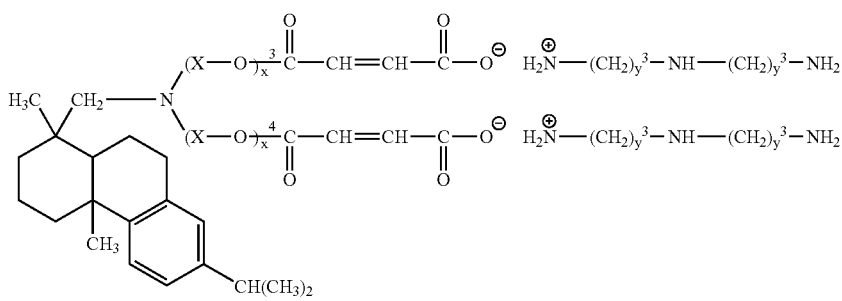

(1a)

in which X is as defined above, $x^3$ and $x^4$ are each a number from 2 to 8 and the sum of $x^3$ and $x^4$ is a number from 6 to 12, and $y^3$ is the number 2 or 3.

Compounds of the formula (1) are described in EP-B1-0 513 782 or can be prepared analogously.

As component d) it is preferred to use salts of Al, Zn, Mn, and Fe, e.g., the sulfates, carbonates, chlorides, nitrates, alkoxides, and carboxylates, such as acetate or citrate, for example, or else hydroxides of Al, Zn, Mn, and Fe. The stated compounds may contain usual amounts of water of crystallization.

As component e) it is possible to add further auxiliaries, such as dispersants, e.g., polyesteramides, or anionic, cationic or nonionic surfactants, such as alcohol alkoxylates, for example.

Preferred pigment preparations are composed essentially of 50 to 90% by weight, in particular 60 to 80% by weight, of component a), 5 to 45% by weight, in particular 10 to 38% by weight, of component b), 0.2 to 5% by weight, in particular 0.5 to 2% by weight, of component c), 0.05 to 2% by weight, in particular 0.3 to 1.5% by weight, of component d), calculated as metal cation, and 0 to 5% by weight, in particular 1.8 to 3.6% by weight, of component e), based in each case on the total weight (100% by weight) of the pigment preparation.

The invention also provides a process for preparing the diaryl yellow pigment preparation, which comprises coupling an acetoacetylanilide with a tetrazonium salt of 3,3'-dichlorobenzidine in the presence of component c); combining the resulting pigment suspension with an aqueous-alkaline solution of component b) and heating it to a temperature between 65 and 150° C.; adding component d) in an amount of from 0.1 to 8% by weight, based on component b), and subsequently precipitating the diaryl yellow pigment preparation by acidification and isolating it.

The diazo component, 3,3'-dichlorobenzidine, can be diazotized by standard methods.

The coupling component used is, for example, acetoacetic anilide, acetoacetic o-toluidide, acetoacetic m-toluidide, acetoacetic m-xylidide, acetoacetic anisidide, acetoacetic 2,5-dimethoxy-4-chloroanilide or a mixture thereof, appropriately in aqueous or aqueous-organic suspension.

In one particularly preferred embodiment the suspension of the coupling component is admixed with an emulsion of a polyesteramide in, for example, an amount of from 1.8 to 3.6% by weight, based on the total mass of the pigment preparation.

The azo coupling takes the place in the presence of one or more compounds of the formula (1) which can be added in the form of an aqueous solution either to the coupling suspension or to the tetrazonium salt of 3,3'-dichlorobenzidine, or to both, or the stated reactants can be combined. The azo coupling takes place preferably in aqueous or aqueous-organic medium, with preference at a pH between 3 and 7, in particular between 4 and 6, and at a temperature between 15 and 30° C., in particular between 20 and 25° C.

After the coupling the pigment suspension is admixed with an aqueous-alkaline solution, e.g., in dilute sodium hydroxide or potassium hydroxide solution, of a natural resin b), the amount of resin, based on pigment, being from 10 to 80% by weight, preferably from 20 to 70% by weight. Subsequently the mixture is heated for preferably at least 15 minutes, normally from 30 minutes to 10 hours, at a temperature of from 65 to 150° C., preferably from 80 to 120° C., more preferably from 85 to 100° C.

The metal compound (component d) is then added in solid, dissolved or suspended form at a temperature between 40 and 100° C., preferably in an amount of from 0.1 to 8% by weight, more preferably from 1 to 4% by weight (calculated as metal cation), based on component b). The pH of the mixture ought to be between 7.1 and 14. Subsequently, using for example hydrochloric, sulfuric or acetic acid, a pH of preferably from 2 to 6, more preferably from 3 to 5, is set, and the diaryl yellow pigment preparation of the invention precipitates out. The suspension is filtered and the solid product is washed free of salt, dried, and, where appropriate, ground.

The pigment preparations of the invention can be dispersed easily in varnishes customary for offset printing inks, e.g., for sheet fed offset, roller offset or newspaper printing, and give printing inks of high color strength and particularly good rheological properties, specifically improved fluidity coupled with high viscosities with high shear rates.

The invention also provides for the use of the above-described diaryl yellow pigment preparation for producing printing inks, especially offset printing inks.

The pigment preparations of the invention are further suitable as colorants in electrophotographic toners and developers, such as one-component or two-component powder toners (also called one-component or two-component developers), magnetic toners, liquid toners, polymerization toners, and further, specialty toners (i.e. Schein, "Electrophotography and Development Physics"; Springer Series in Electrophysics 14, Springer Verlag, 2nd edition, 1992). Additionally the pigment preparations of the invention are suitable as colorants in inkjet inks on an aqueous and a nonaqueous basis, and also in those inks which operate in accordance with the hotmelt process or are based on microemulsions.

In the examples below the color strength was determined calorimetrically from test-rig sample prints on art printing paper Apco II/II (from Scheuffelen, Oberlenningen) with an ink application of 1.5 g/m².

The viscosities were determined on a Laray viscometer, the viscosity being read off at 12 Laray seconds.

For the determination of the fluidity, 1 g of the offset ink was applied to a sloping plane (45° angle) and a measurement was made of the flow path after a flow time of 3 seconds, in mm. The higher the result, the better the fluidity.

Parts denote parts by weight. Percentages denote percent by weight.

EXAMPLE 1

A coupling component suspension having a pH of 5.6, prepared from 11.6 parts (30 mol %) of acetoacetic o-toluidide and 28.8 parts (70 mol %) of acetoacetic m-xylidide with 27.2 parts of 33% strength sodium hydroxide solution in 500 parts of water and subsequent precipitation with 80% strength acetic acid is admixed with 0.7 part of the compound of the formula (1b)

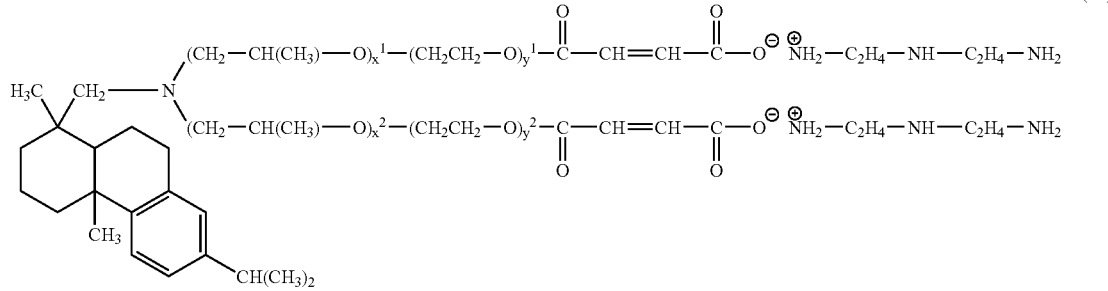

with $x^1+x^2=4$; $y^1+y^2=6$.

Subsequently the suspension is coupled in one hour at a pH range between 5.7 and 5.3 and at a temperature of from 20 to 25° C. with an approximately 10% strength aqueous 3,3'-dichlorobenzidine tetraazo solution (prepared by bisdiazotizing 25.3 parts of 3,3'-dichlorobenzidine in dilute HCl and sodium nitrite).

Sodium hydroxide solution is used to adjust the pH of the pigment suspension to 7.5, after which it is admixed with a resin solution composed of 87.5 parts of water, 19 parts of disproportionated rosin and 11.2 parts of 33% strength NaOH. The temperature of the suspension is raised to 95° C. and held for 3 hours. At 65° C. (cooling with ice), the pH is deacidified to about 8 by addition of 8 parts of $Al_2(SO_4)_3 \cdot 18H_2O$. After 30 minutes the suspension is adjusted to a pH of 5 using hydrochloric acid and is filtered and the solid product is washed free of salt, dried at 63° C. and ground on a pinned disk mill.

This gives 86.1 g of a diaryl yellow pigment preparation containing P.Y. 174.

COMPARATIVE EXAMPLE 1a (AGAINST EP-B-0 513 782)

The procedure of example 1 is repeated but with the difference that no Al sulfate is added.

COMPARATIVE EXAMPLE 1b (AGAINST EP-A-0 671 443)

The procedure of example 1 is repeated but with the difference that no compound of the formula (1b) is added.

COMPARATIVE EXAMPLE 1c (AGAINST EP-A-0 313 360)

The procedure of example 1 is repeated but with the difference that no compound of the formula (1b) is added and that 97.2% by weight of disproportionated rosin, based on pigment, is added.

EXAMPLE 2

A coupling component suspension having a pH of 5.6, prepared from 3.9 parts of acetoacetic 2,5-dimethoxy-4-chloroanilide and 38.9 parts of acetoacetic m-xylidide with 36 parts of 33% strength sodium hydroxide solution in 500 parts of water and subsequent precipitation with 9.6 parts of 80% strength acetic acid and 22.3 parts of 31% strength hydrochloric acid is admixed with 0.86 part of the compound of the formula (1b). Subsequently the suspension is coupled in one hour at a pH range between 5.6 and 4.5 and at a temperature of from 20 to 25° C. with an approximately 10% strength aqueous 3,3'-dichlorobenzidine tetraazo solution (prepared by bisdiazotizing 25.3 parts of DCB in dilute HCl and sodium nitrite).

Sodium hydroxide solution is used to adjust the pH of the pigment suspension to 7.5, after which it is admixed with a resin solution composed of 150 parts of water, 37.5 parts of disproportionated rosin and 22.4 parts of 33% strength NaOH. The temperature of the suspension is raised to 95° C. and held for 3 hours. At 65° C. (cooling with ice), the pH is deacidified to about 8 by addition of 15 parts of $Al_2(SO_4)_3 \cdot 18H_2O$. After 30 minutes the suspension is adjusted to a pH of 5 using hydrochloric acid and is filtered and the solid product is washed free of salt, dried at 60° C. and ground on a pinned disk mill.

This gives 107 g of a diaryl yellow pigment preparation containing P.Y. 176.

COMPARATIVE EXAMPLE 2a (AGAINST EP-B-0 513 782)

The procedure of example 2 is repeated but with the difference that no Al sulfate is added.

EXAMPLE 3

A coupling component suspension having a pH of 5.6, prepared from 7.2 parts of acetoacetic anilide and 33.1 parts of acetoacetic m-xylidide with 27.2 parts of 33% strength sodium hydroxide solution in 500 parts of water and subsequent precipitation with 80% strength acetic acid is admixed with 0.7 part of the compound of the formula (1b). Subsequently the suspension is coupled in one hour at a pH of 5.5 (pH is held constant by simultaneous introduction of NaOH solution) at a temperature of from 20 to 25° C. with an approximately 10% strength aqueous 3,3'-dichlorobenzidine tetraazo solution (prepared by bisdiazotizing 25.3 parts of DCB in dilute HCl and sodium nitrite).

Sodium hydroxide solution is used to adjust the pH of the pigment suspension to 11, after which it is admixed with a resin solution composed of 188 parts of water, 32.5 parts of disproportionated rosin and 20.0 parts of 33% strength NaOH. The temperature of the suspension is raised to 95° C.

and held for 0.5 h. At 65° C. (cooling with ice), the pH is deacidified to about 9 by addition of 13 parts of $Al_2(SO_4)_3 \cdot 18H_2O$. After 30 minutes the suspension is adjusted to a pH of 5 using hydrochloric acid and is filtered and the solid product is washed free of salt, dried at 60° C. and ground on a pinned disk mill.

This gives 99 g of a diaryl yellow pigment preparation containing P.Y. 188.

COMPARATIVE EXAMPLE 3a (AGAINST EP-B-0 513 782)

The procedure of example 3 is repeated but with the difference that no Al sulfate is added.

EXAMPLE 4

A coupling component suspension having a pH of 5.6, prepared from 8.55 parts of acetoacetic o-anisidide and 32.8 parts of acetoacetic m-xylidide with 40.8 parts of 33% strength sodium hydroxide solution in 292 parts of water and subsequent precipitation with 10.8 parts of 80% strength acetic acid and about 25.5 parts of 31% strength hydrochloric acid is admixed with 0.65 part of the compound of the formula (1b). Subsequently the suspension is coupled in one hour at a pH range between 5.6 and 4.5 and at a temperature of from 20 to 25° C. with an approximately 10% strength aqueous 3,3'-dichlorobenzidine tetraazo solution (prepared by bisdiazotizing 25.3 parts of DCB in dilute HCl and sodium nitrite).

Sodium hydroxide solution is used to adjust the pH of the pigment suspension to approximately 11, after which it is admixed with a resin solution composed of 75 parts of water, 18.8 parts of rosin and 9.5 parts of 33% strength NaOH. The temperature of the suspension is raised to 95° C. and held for 2 hours. At 65° C. (cooling with ice), and the pH is deacidified to about 8 by addition of 10 parts of $Al_2(SO_4)_3 \cdot 18H_2O$. After 30 minutes the suspension is adjusted to a pH of 5 using hydrochloric acid and is filtered and the solid product is washed free of salt, dried at 63° C. and ground on a pinned disk mill.

This gives 84.2 g of a diaryl yellow pigment preparation containing P.Y. 127.

COMPARATIVE EXAMPLE 4a (AGAINST EP-B-0 513 782)

The procedure of example 4 is repeated but with the difference that no Al sulfate is added.

EXAMPLE 5

The procedure of example 1 is repeated but with the difference that following the addition of the compound of the formula (1b) an emulsion of 2.75 parts of polyesteramide in water is added as well to the arylide solution.

Instead of the resin solution of example 1 a resin solution is used which is composed of 150 parts of water, 30 parts of disproportionated rosin and 19.0 parts of 33% strength NaOH. The amount of $Al_2(SO_4)_3 \cdot 18H_2O$ is 12 parts.

This gives 101 g of a diaryl yellow pigment preparation containing P.Y. 174.

COMPARATIVE EXAMPLE 5a (AGAINST EP-B-0 513 782)

The procedure of example 5 is repeated but with the difference that no Al sulfate is added.

EXAMPLE 6

The procedure of example 2 is repeated but with the difference that following the addition of the compound of the formula (1b) an emulsion of 3 parts of polyesteramide in water is added as well to the arylide solution.

The amount of $Al_2(SO_4)_3 \cdot 18H_2O$ is 16 parts.

This gives 110 g of a diaryl yellow pigment preparation containing P.Y. 176.

COMPARATIVE EXAMPLE 6a (AGAINST EP-B-0 513 782)

The procedure of example 6 is repeated but with the difference that no Al sulfate is added.

EXAMPLE 7

A coupling component suspension having a pH of 5.6, prepared from 11.6 parts (30 mol %) of acetoacetic o-toluidide and 28.8 parts (70 mol %) of acetoacetic m-xylidide with 27.2 parts of 33% strength sodium hydroxide solution in 500 parts of water and subsequent precipitation with 80% strength acetic acid is admixed with 0.7 part of the compound of the formula (1b). Subsequently the suspension is coupled in one hour at a pH range between 5.7 and 5.3 and at a temperature of from 20 to 25° C. with an approximately 10% strength aqueous 3,3'-dichlorobenzidine tetraazo solution (prepared by bisdiazotizing 25.3 parts of DCB in dilute HCl and sodium nitrite).

Sodium hydroxide solution is used to adjust the pH of the pigment suspension to approximately 7.5, after which it is admixed with a resin solution composed of 150 parts of water, 30 parts of disproportionated rosin and 14 parts of 33% strength NaOH. The temperature of the suspension is raised to 95° C. and held for 3 hours. At 65° C. (cooling with ice), 20.8 parts of $ZnCl_2$ are added. The pH is adjusted to 9 using HCl. After 30 minutes the suspension is adjusted to a pH of 5 using hydrochloric acid and is filtered and the solid product is washed free of salt, dried at 63° C. and ground on a pinned disk mill.

This gives 96.4 g of a diaryl yellow pigment preparation containing P.Y. 174.

EXAMPLE 8

The procedure of example 7 is repeated but with the difference that instead of the addition of the Zn salt 13 parts of $FeCl_2$ are added.

This gives 102.7 g of a diaryl yellow pigment preparation containing P.Y. 174.

EXAMPLE 9

The procedure of example 7 is repeated but with the difference that instead of the addition of the Zn salt 20 parts of $MnCl_2 \cdot 4H_2O$ are added.

This gives 98.7 g of a diaryl yellow pigment preparation containing P.Y. 174.

USE EXAMPLES

The pigment preparations of the examples above are used to produce offset inks, by stirring the ground pigment preparation into the offset varnish below and dispersing the composition on a triple-roll mill. The printing inks thus produced are tested after storage for 24 hours.

The corresponding printing inks have the following compositions:
12.0 parts pigment preparation
38.0 parts ®Albertol VKP 1385 (from Solutia, Germany)
4.5 parts ®Vialkyd AL 766 (from Solutia, Germany)
42.5 parts printing ink oil PKW F 6/9 (from Haltermann, Hamburg)
2.8 parts ®Printael (SUN Chemical-Hartmann, Frankfurt)
0.2 Dart siccative
100.0 parts.
The results are shown in the table below.

TABLE

| Pigment preparation of example | Fluidity in mm | Laray viscosity in Pa · s | Color strength* in % |
|---|---|---|---|
| 1 | 50 | 29 | 105 |
| Comparative example 1a | 17 | 19 | 109 |
| Comparative example 1b | 12 | 26 | 84 |
| Comparative example 1c | 0 | 31 | 55 |
| 2 | 25 | 30 | 104 |
| Comparative example 2a | 13 | 13 | 108 |
| 3 | 87 | 18 | 88 |
| Comparative example 3a | 60 | 12 | 88 |
| 4 | 54 | 28 | 102 |
| Comparative example 4a | 27 | 16 | 104 |
| 5 | 83 | 24 | 100 |
| Comparative example 5a | 43 | 12 | 105 |
| 6 | 86 | 24 | 99 |
| Comparative example 6a | 56 | 12 | 104 |
| 7 | 40 | 20 | 104 |
| 8 | 58 | 23 | 109 |
| 9 | 114 | 36 | 111 |

*Color strength relative to Permanent Yellow GRX 86 (100%), a commercially available standard product for offset applications, unstandardized. Consequently, the color strengths of the comparative examples containing no Al salt are in some cases higher.

It is evident that only the examples in accordance with the invention possess both a high fluidity and a high Laray viscosity. The pigment preparations of comparative example 1b and 1c have deficiencies in color strength.

The invention claimed is:

1. A diaryl yellow pigment preparation comprising
   a) at least one diaryl yellow pigment,
   b) at least one natural resin based on rosin or modified rosin,
   c) at least one compound of the formula (1)

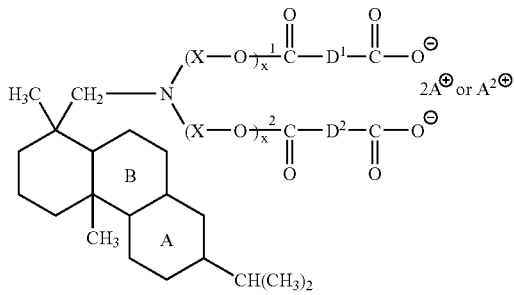

(1)

in which the ring A is saturated, unsaturated or aromatic and the ring B is saturated or unsaturated;
   X is selected from the group consisting of $CH_2$—$CH_2$—, —$CH_2CH(CH_3)$ —$CH(CH_3)CH_2$—, and a combination thereof;
   $x^1$ and $x^2$ are a number from 0 to 16, the sum of $x^1$ and $x^2$ being a number from 2 to 20;
   $D^1$ and $D^2$ are identical or different and are a saturated or olefinic $C_1$–$C_4$-hydrocarbon radical;

$A^\oplus$ and $A^{2\oplus}$ are an ammonium ion of an amine of the formula

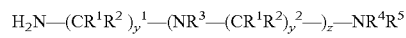

in which $R^1$ to $R^5$ are identical or different and are hydrogen, methyl or ethyl,
$y^1$ and $y^2$ are each a number from 1 to 4, and z is a number from zero to 10; and
   d) an aluminum, zinc, manganese or iron compound in an amount of from 0.1 to 8% by weight (calculated as metal cation), based on component b).

2. A diaryl yellow pigment preparation as claimed in claim 1,
wherein the diaryl yellow pigment a) is a compound of the formula (2)

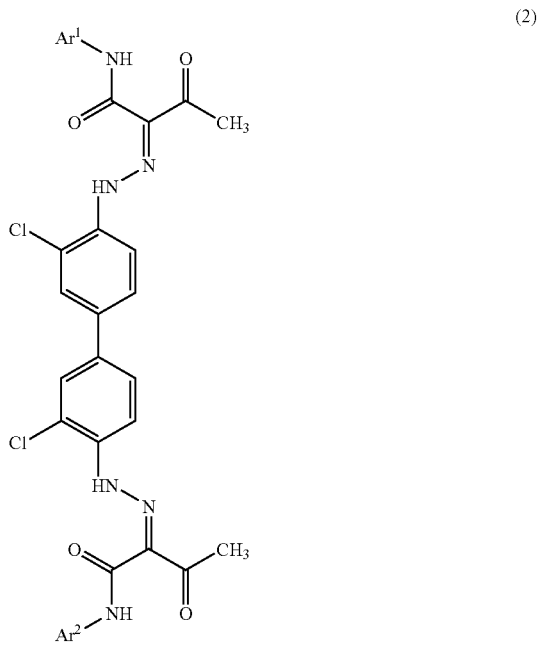

(2)

in which $Ar^1$ and $Ar^2$ are identical or different and are an unsubstituted phenyl group or a phenyl group substituted by from one to three substituents selected from the group consisting of halogen, methyl, and methoxy.

3. A diaryl yellow pigment preparation as claimed in claim 1,
wherein the diaryl yellow pigment is C.I. Pigment Yellow 12, 13, 14, 17, 126, 127, 174, 176, 188 or a mixture thereof.

4. A diaryl yellow pigment preparation as claimed in claim 1,
wherein the natural resin b) is abietic acid, dehydroebietic acid, dihydroabietic acid, tetrahydroabietic acid, levopimanc acid, dextropimanc acid, isodextropimaric acid, or a mixture thereof.

5. A diaryl yellow pigment preparation as claimed in claim 1,
wherein in the compound of the formula (1)
$x^1$ and $x^2$ are a number from 1 to 10, the sum of $x^1$ and $x^2$ being from 4 to 16;
$D^1$ and $D^2$ are —$CH_2$—, $CH_2CH_2$—, —$(CH_2)_4$—or —$CH=CH$—;
$y^1$ and $y^2$ are each the number 2 or 3; and
z is a number from 1 to 4.

6. A diaryl yellow pigment preparation as claimed in claim 1,
wherein c) is a compound of the formula (1a)

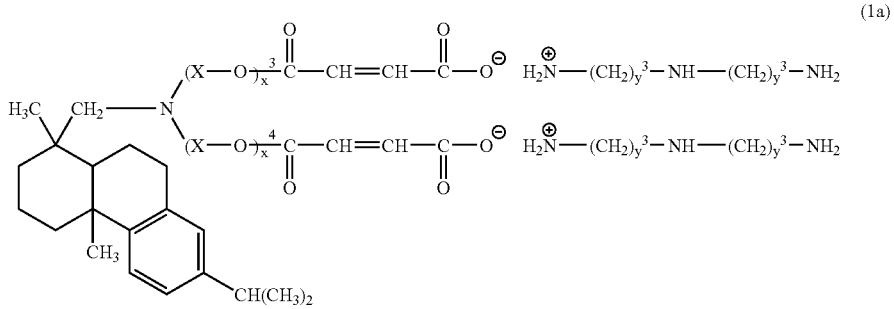

$x^3$ and $x^4$ each a number from 2 to 8 and the sum of $x^3$ and $x^4$ is a number from 6 to 12, and $y^3$ is the number 2 or 3.

7. A diary yellow pigment preparation as claimed in claim 1,
wherein component d) is a sulfate, carbonate, chloride, nitrate, alkoxide, carboxylate, acetate, citrate or hydroxide of metals Al, Zn, Mn or Fe.

8. A diaryl yellow pigment preparation as claimed in claim 1,
consisting essentially of
50 to 90% by weight of component a),
5 to 45% by weight of component b),
0.2 to 5% by weight of component c), and
0.05 to 2% by weight of component d), calculated as metal cation,
based in each case on the total weight (100% by weight) of the pigment preparation.

9. A diaryl yellow pigment preparation as claimed in claim 1, comprising:
50 to 90% by weight of component a),
5 to 45% by weight of component b),
0.2 to 5% by weight of component c), and
0.05102% by weight of component d), calculated as metal cation,
based in each case on the total weight (100% by weight) of the pigment preparation.

10. A diaryl yellow pigment preparation as claimed in claim 1, further comprising a polyesteramide.

11. A process for preparing a diaryl yellow pigment preparation as claimed in claim 1, comprising the steps of coupling an acetoacetylanilide with a tetrazonium salt of 3,3'-dichlorobenzidine in component c); combining the resulting pigment suspension with an aqueous-alkaline solution of component b) and heating to a temperature between 65 and 150° C.; adding component d) in an amount of from 0.1 to 8% by weight, based on component b), and subsequently precipitating the diary yellow pigment preparation by acidification and isolating the diaryl yellow pigment preparation.

12. A printing ink comprising the diaryl yellow pigment preparation as claimed in claim 1.

13. An inkjet ink colorant comprising the diaryl yellow pigment preparation as claimed in claim 1.

14. A toner colorant comprising the diaryl yellow pigment preparation as claimed in claim 1.

15. The toner colorant as claimed in claim 14, wherein the toner is selected from the group consisting of electrophotographic toners and developers, magnetic toners, liquid toners, polymerization toners and specialty toners.

* * * * *